United States Patent
Tang (10) Patent No.: US 11,736,977 B2
(45) Date of Patent: Aug. 22, 2023

(54) METHOD FOR HEADER COMPRESSION OF ETHERNET FRAME, TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 253 days.

(21) Appl. No.: 17/232,969

(22) Filed: Apr. 16, 2021

(65) Prior Publication Data

US 2021/0243647 A1 Aug. 5, 2021

Related U.S. Application Data (63) Continuation of application No. PCT/CN2019/072001, filed on Jan. 16, 2019.

(51) Int. Cl.
| | | |
|---|---|---|
| *H04W 28/06* | (2009.01) | |
| *H04L 69/04* | (2022.01) | |
| *H04L 12/46* | (2006.01) | |
| *H04L 69/22* | (2022.01) | |

(52) U.S. Cl.
CPC ......... *H04W 28/06* (2013.01); *H04L 12/4641* (2013.01); *H04L 69/04* (2013.01); *H04L 69/22* (2013.01)

(58) Field of Classification Search
None
See application file for complete search history.

(56) References Cited

U.S. PATENT DOCUMENTS

| 10,205,660 B2 | 2/2019 | Cox et al. | |
| 2009/0141629 A1* | 6/2009 | Gerosa | H04L 69/04 |
| | | | 370/235 |
| 2010/0142560 A1* | 6/2010 | Sharivker | H04L 69/04 |
| | | | 370/477 |
| 2014/0086250 A1* | 3/2014 | Mitsumori | H04L 45/72 |
| | | | 370/392 |

(Continued)

FOREIGN PATENT DOCUMENTS

| CN | 101326502 | 12/2008 |
| CN | 102025737 | 4/2011 |

(Continued)

OTHER PUBLICATIONS

CNIPA, First Office Action for CN Application No. 202110407372.6, dated Jul. 22, 2022.

(Continued)

*Primary Examiner* — Kenny S Lin
(74) *Attorney, Agent, or Firm* — Hodgson Russ LLP (57) ABSTRACT

A method for header compression of an Ethernet frame, a terminal device, and a non-transitory computer readable storage medium are provided. The method includes the following. A device determines, according to configuration information, that header compression needs to be performed on the Ethernet frame. The device determines a header compression object in the Ethernet frame according to specific information. The device performs header compression on the header compression object.

12 Claims, 5 Drawing Sheets

(56) References Cited

U.S. PATENT DOCUMENTS

| | | | | |
|---|---|---|---|---|
| 2014/0355516 | A1* | 12/2014 | Baudoin | H04L 69/22 |
| | | | | 370/316 |
| 2014/0369365 | A1* | 12/2014 | Denio | H04L 69/16 |
| | | | | 370/474 |
| 2016/0359739 | A1 | 12/2016 | Cox et al. | |
| 2019/0116521 | A1* | 4/2019 | Qiao | H04L 69/04 |
| 2020/0267241 | A1* | 8/2020 | Johansson | H04L 69/04 |

FOREIGN PATENT DOCUMENTS

| | | | | |
|---|---|---|---|---|
| CN | 103825869 | | 5/2014 | |
| CN | 104079488 | | 10/2014 | |
| CN | 109218995 | | 1/2019 | |
| CN | 110958646 | | 4/2020 | |
| EP | 2314045 | | 4/2011 | |
| EP | 3852486 | A1 * | 7/2021 | H04L 69/04 |
| WO | 2011047621 | | 4/2011 | |
| WO | WO-2020062091 | A1 * | 4/2020 | H04L 69/04 |
| WO | WO-2020077543 | A1 * | 4/2020 | H04L 12/4641 |
| WO | WO-2020097855 | A1 * | 5/2020 | |
| WO | WO-2020125988 | A1 * | 6/2020 | H04L 69/04 |

OTHER PUBLICATIONS

WIPO, International Search Report and Written Opinion for PCT/CN2019/072001, dated Oct. 10, 2019.
EPO, Office Action for EP 19910588.3, dated May 12, 2022.
CNIPA, Second Office Action for CN Application No. 202110407372.6, dated Oct. 18, 2022.
Oppo, "Ethernet Header Compression," 3GPP TSG-RAN WG2 #104, R2-1817249, Nov. 2018.
Nokia et al., "Ethernet Header Compression for TSN," 3GPP TSG-RAN WG2 Meeting #104, R2-1817269, Nov. 2018.
Ericsson, "Ethernet Header Compression," 3GPP TSG-RAN WG2 #103bis, Tdoc R2-1814811, Oct. 2018.
EPO, Extended European Search Report for EP Application No. 19910588.3, dated Oct. 7, 2021.

* cited by examiner

METHOD FOR HEADER COMPRESSION OF ETHERNET FRAME, TERMINAL DEVICE

CROSS REFERENCE TO RELATED APPLICATION(S)

This application is a continuation of International Application No. PCT/CN2019/072001, filed on Jan. 16, 2019, the entire disclosure of which is incorporated herein by reference.

TECHNICAL FIELD

This disclosure relates to the field of wireless network technology, and more particularly to a method for header compression of an Ethernet frame and a terminal device.

BACKGROUND

In a traditional communication system, header compression can be performed only on a data packet of which a type of protocol data unit (PDU) session is an Internet protocol (IP) packet. In a 5G new radio (NR) system, besides an IP packet, such as Internet protocol version 4 (IPv4) and Internet protocol version 6 (IPv6), the type of PDU session can also be an Ethernet frame.

Header compression refers to compression of a data packet header to improve transmission efficiency of user data. In a packet data convergence protocol (PDCP), robust header compression (RoHC) is adopted for header compression of the data packet header.

For the Ethernet frame, air interface resources are limited. Under a certain scenario, the number of bytes required by a packet header of the Ethernet frame is much larger than that required by a data part, and some sub-headers in the packet header are actually transmitted redundantly. As a result, a large quantity of resources are allocated for transmitting redundant packet headers, which causes waste of air interface resources and reduced data transmission efficiency. Header compression can solve the above problem, but there is currently no solution to realizing header compression of the Ethernet frame.

SUMMARY

In a first aspect, a method for header compression of an Ethernet frame is provided. The method includes the following. A first device determines, according to configuration information, that header compression needs to be performed on the Ethernet frame. The first device determines a header compression object in the Ethernet frame according to specific information. The first device performs header compression on the header compression object.

In a second aspect, a terminal device is provided. The terminal device includes a processor and a memory. The memory is configured to store computer programs. The processor is configured to invoke and execute the computer programs stored in the memory to perform the method described in the first aspect or in other implementations.

In a third aspect, a non-transitory computer readable storage medium is provided. The computer readable storage medium is configured to store computer programs which are operable with a computer to perform the method described in the first aspect or in other implementations.

DETAILED DESCRIPTION

The following will describe technical solutions of implementations with reference to the accompanying drawings. Apparently, implementations described herein are merely some implementations, rather than all implementations, of the disclosure. Implementations herein are applicable to a frame structure without an IP packet in Ethernet frame, and are also applicable to a frame structure with an IP packet in Ethernet frame. Based on the implementations described herein, all other implementations obtained by those of ordinary skill in the art without creative effort shall fall within the protection scope of the disclosure.

The technical solutions of implementations are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a 5th generation mobile network (5G) system.

Figure 1:
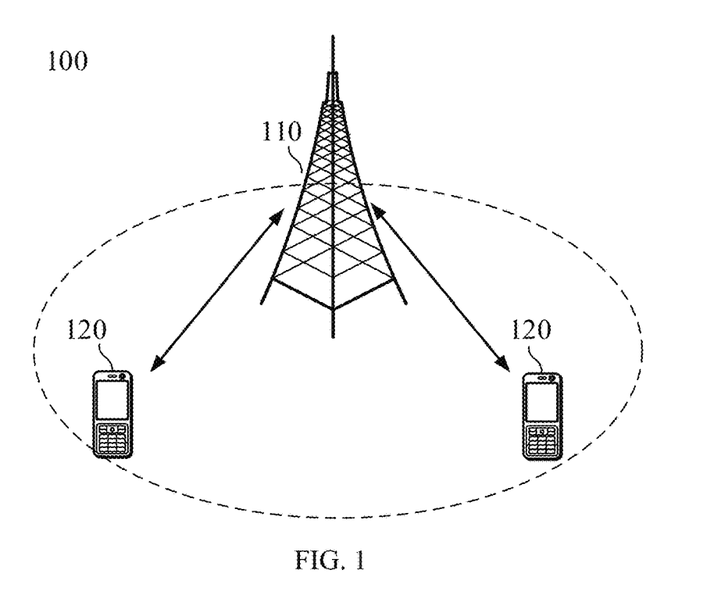
FIG. 1 is a schematic diagram of an architecture of a communication system according to implementations.

FIG. 1 is a schematic diagram of an architecture of a communication system according to implementations. As illustrated in FIG. 1, the communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 located in the coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 120 can communicate with each other through device to device (D2D) communication.

As an example, the 5G system or 5G network can also be referred to as an NR system or NR network.

Technical solutions in implementations are applicable to an unlicensed frequency spectrum, and also applicable to a licensed frequency spectrum, and the disclosure is not limited in this regard.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to implementations, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

Figure 2:
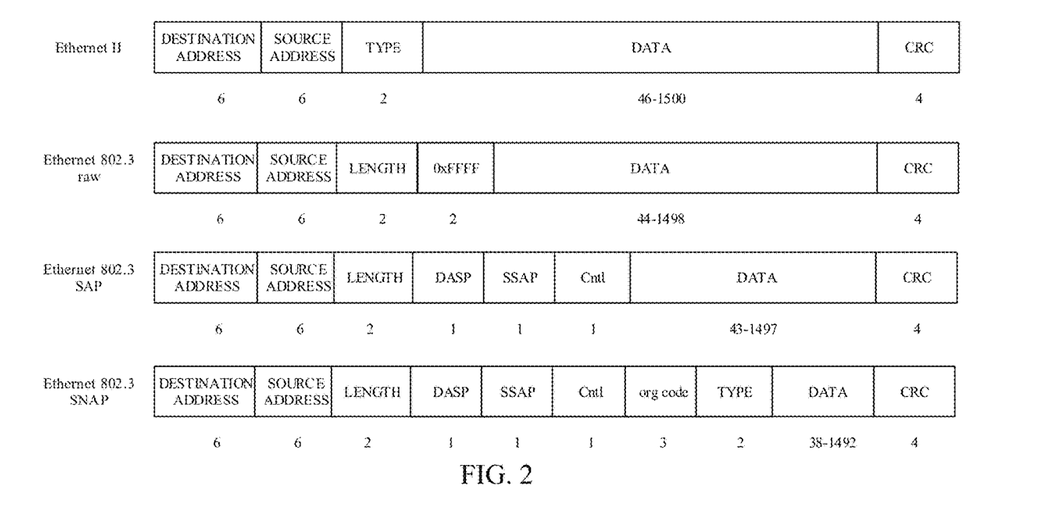
FIG. 2 is a schematic diagram illustrating four Ethernet frame formats, i.e. Ethernet II, Ethernet 802.3 raw, Ethernet 802.3 session announcement protocol (SAP), and Ethernet 802.3 subnetwork access control (SNAP), according to implementations.

The Ethernet frame has many different formats. For example, Ethernet frame formats that are commonly seen and used include, but are not limited to, Ethernet II, Ethernet 802.3 raw, Ethernet 802.3 SAP, and Ethernet 802.3 SNAP. FIG. 2 is a schematic diagram illustrating four Ethernet frame formats, i.e. Ethernet II, Ethernet 802.3 raw, Ethernet 802.3 SAP, and Ethernet 802.3 SNAP, according to implementations.

The following will describe in detail the subheader in each Ethernet frame format. It should be noted that, at the beginning of an Ethernet frame header (prior to a destination address), there is usually a preamble field, or a preamble field and a start of frame delimiter (SFD), which occupy 8 bytes.

TABLE 1

Ethernet II

| Field | Size | Definition |
|---|---|---|
| Destination address | 6 bytes | Destination media access control (MAC) address. |
| Source address | 6 bytes | Source MAC address. |
| Type | 2 bytes | Type refers to a protocol type. |
| Data | 46~1500 bytes | Data field has a minimum size of 46 bytes to ensure that a frame is at least 64 bytes long, which means that a data field of 46 bytes is required even if only 1 byte of information is transmitted. If information filled in the data field is less than 46 bytes, padding is added to the remaining part of the data field. Data field has a maximum size of 1500 bytes. |
| Cyclic redundancy check (CRC) | 4 bytes | CRC is used for checking errors in the frame (also referred to as frame check sequence (FCS)). |

TABLE 2

Ethernet 802.3 raw

| Field | Size | Definition |
|---|---|---|
| Destination address | 6 bytes | Destination MAC address. |
| Source address | 6 bytes | Source MAC address. |
| Length | 2 bytes | The length of the data in the frame, not including a CRC code. |
| 0xFFFF | 2 bytes | 0xFFFF identifies the frame as a data frame of Novell Ethernet. |

TABLE 2-continued

Ethernet 802.3 raw

| Field | Size | Definition |
|---|---|---|
| Data | 44~1498 bytes | Payload. |
| CRC | 4 bytes | CRC is used for checking errors in the frame (also referred to as FCS). |

TABLE 3

Ethernet 802.3 SAP

| Field | Size | Definition |
|---|---|---|
| Destination address | 6 bytes | Destination MAC address. |
| Source address | 6 bytes | Source MAC address. |
| Length | 2 bytes | The length of the data in the frame, not including a CRC code. |
| Destination service access point (DSAP) | 1 byte | Destination service access point. This field has value 0x06 if the frame is classified as an IP frame. |
| Source service access point (SSAP) | 1 byte | Source service access point. This field has value 0x06 if the frame is classified as an IP frame. |
| Cntl | 1 byte | This field generally has value 0x03, which refers to an IEEE 802.2 unnumbered data format in a connectionless service. |
| Data | 43~1497 bytes | Payload. |
| CRC | 4 bytes | CRC is used for checking errors in the frame (also referred to as FCS). |

TABLE 4

Ethernet 802.3 SNAP

| Field | Size | Definition |
|---|---|---|
| Destination address | 6 bytes | Destination MAC address. |
| Source address | 6 bytes | Source MAC address. |
| Length | 2 bytes | The length of the data in the frame, not including a CRC code. |
| DSAP | 1 byte | Destination service access point. This field has value 0x06 if the frame is classified as an IP frame. |
| SSAP | 1 byte | Source service access point. This field has value 0x06 if the frame is classified as an IP frame. |
| Cntl | 1 byte | This field usually has value 0x03, which refers to an IEEE 802.2 unnumbered data format in a connectionless service. |
| SNAP-ID | 5 bytes | SNAP-ID is composed of organizationally unique identifier (OUI) and type. |
| org code | 3 bytes | OUI (3 bytes) is usually the same as the first three bytes of a MAC address, that is, a vendor code. |
| Type | 2 bytes | Type identifies a type of upper layer data carried by the Ethernet frame. |
| Data | 38~1492 bytes | Payload. |
| CRC | 4 bytes | CRC is used for checking errors in the frame (also referred to as FCS). |

Figure 3:
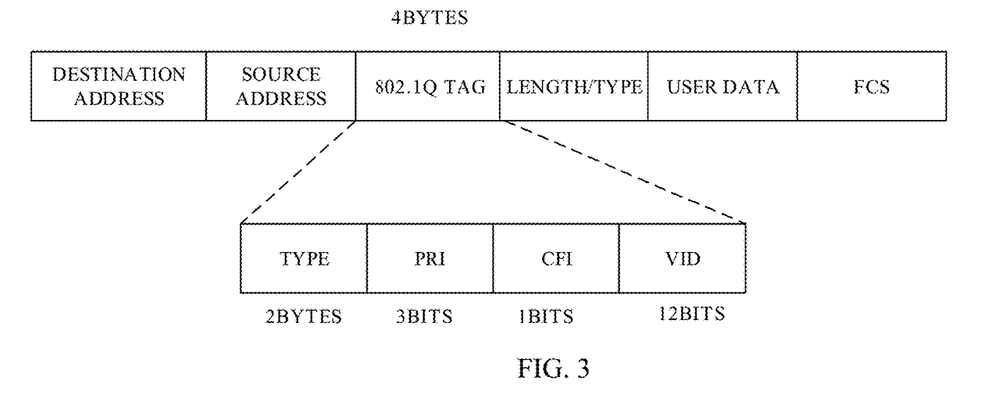
FIG. 3 is a schematic diagram illustrating a virtual local area network (VLAN) frame format in an institute of electrical and electronics engineers (IEEE) 802.1Q standard according to implementations.

In an IEEE 802.1Q standard, the Ethernet frame format is modified. An 802.1Q tag of 4 bytes is inserted between a source address field and a type field, to obtain the 802.1Q tag. FIG. 3 is a schematic diagram illustrating a VLAN frame format in the IEEE 802.1Q standard according to implementations. The following will elaborate a subheader in a VLAN frame format.

TABLE 5

VLAN frame format

| Field | Size | Definition |
|---|---|---|
| Destination address | 6 bytes | Destination MAC address. |
| Source address | 6 bytes | Source MAC address. |
| 802.1Q tag | 4 bytes | The 802.1Q tag is composed of tag protocol ID (TPID), priority (PRI), canonical format indicator (CFI)/drop eligible indicator (DEI), and VLAN ID (VID). |
| Type (TPID) | 2 bytes | TPID indicates the frame type. The value 0x8100 indicates an IEEE 802.1Q frame. An 802.1Q-incapable device discards 802.1Q frames. |
| PRI | 3 bits | PRI refers to priority, which indicates the 802.1p priority of a frame. PRI has a value in the range from 0 to 7. A larger value indicates a higher priority. If congestion occurs, send packets with the highest priority first. |
| CFI/DEI | 1 bit | CFI refers to canonical format indicator, indicating whether a MAC address is encapsulated in a canonical format. The value 0 indicates that the MAC address is encapsulated in a canonical format, and the value 1 indicates that the MAC address is encapsulated in a non-canonical format. CFI is used for distinguishing between the Ethernet frame, a fiber distributed digital interface (FDDI) frame, and a token ring frame. The CFI field has a fixed value of 0 on Ethernet networks. DEI refers to drop eligible indicator. In an 802.1ad protocol, DEI indicates frames that can be dropped during congestion, which is used to identify the color of a packet. For example, 0 indicates green and 1 indicates yellow. When color-based early drop is enabled, a yellow packet will be discarded when congestion occurs. |
| VID | 12 bits | VID refers to VLAN ID, which indicates a VLAN to which a frame belongs. In a versatile router platform (VRP), available VIDs are in the range from 1 to 4094. The values 0 and 4095 are reserved. Three types: Untagged frame: VID is empty; Priority-tagged frame: VID has value 0x000; VLAN-tagged frame: VID is in the range from 0 to 4095; Three special VIDs: 0x000: the 802.1Q tag specifies only a priority, but the frame does not carry a VID; 0x001: default VID; 0xFFF: reserved VID; |
| Length/type | 2 bytes | The length of the data in the frame, not including a CRC code. |
| Data | 42~1500 bytes | Payload (which may contain padding bits). |
| CRC | 4 bytes | CRC is used for checking errors in the frame (also referred to as FCS). |

As can be seen from the above tables, Ethernet frames of different formats have common parts, such as destination address, source address, type/length field, etc. At the same time, each Ethernet frame format has its unique part, such as DSAP, SSAP, or the like in a SAP format, or SNAP-ID, DSAP, SSAP, or the like in a SNAP format. In addition, considering support for VLAN, each Ethernet frame can include a VLAN subheader.

The preamble, the SFD, and the FCS in the Ethernet frame are not transmitted in a 5G system. Accordingly, in some implementations, header compression is not performed on the preamble, the SFD, and the FCS.

Based on description of subheaders in the above tables and transmission characteristics of subheaders, different subheaders can be classified into different classes.

In some implementations, the different classes at least include one of: static, static-def, static-known, changing, and inferred, where static, static-def, and static-known are collectively referred to as a static class, and inferred, static, static-def, and static-known are collectively referred to as a first class. The different classes can be as follows.

Static-def can include the following: A. a part common to all Ethernet frame formats, such as destination address and source address; and B. a part which is unique to each Ethernet frame format and is unchanged or nearly unchanged, for example, DSAP and/or SSAP in a SAP format, or DSAP and/or SSAP in a SNAP format.

Static can include the following: A. for example, Cntl in an SAP format; and B. a part which is unique to a VLAN subheader and is unchanged or nearly unchanged, such as TP-ID, VID, and/or CFI/DEI.

Static-known can include, for example, Cntl in a SNAP format.

Changing can include, for example, type in an Ethernet II format, length in an SAP format, length and/or type in a SNAP format, or PRI in a VLAN subheader, where type and length both belong to EtherType part.

Inferred can include, for example, org code in a SNAP format.

The above manners of classification are merely examples and are however not intended to limit the technical solutions of implementations. In practice, each part can be classified flexibly according to actual needs.

For example, DASP and/or SSAP in a SNAP format can be classified as static-known.

For another example, Cntl in an SAP format can be classified as static-def or static-known.

For another example, Cntl in a SNAP format can be classified as static-def, inferred, or changing.

For another example, length in an SAP format can be classified as inferred, and length in a SNAP format can also be classified as inferred.

For another example, type in an Ethernet II format can be classified as inferred or static.

For another example, org code in a SNAP format can be classified as static-known or static.

For another example, TP-ID and/or CFI/DEI in a VLAN subheader can be classified as inferred or changing.

For another example, destination address, source address, DSAP, and/or SSAP can be classified as static.

For another example, Cntl in an SAP format can also be classified as changing.

For another example, EtherType part can also be classified as inferred. EtherType part can include EtherType part in an Ethernet II format, EtherType part in an SAP format, and/or EtherType part in a SNAP format.

The above manners of classification can be combined.

In some implementations, when the Ethernet frame is carried in a PDU session, a quality of service (QoS) flow, or a data radio bearer (DRB), header compression can be performed on the Ethernet frame based on the PDU session, the QoS flow, or the DRB.

In some implementations, the header compression object at least includes one of the following first–eighth class header compression objects.

A first-class header compression object including a part of the static class (at least including one of: static, static-def, and static-known) and common to different Ethernet frame formats, for example, destination address part and source address part;

A second-class header compression object including a part common to different Ethernet frame formats, for example, destination address part, source address part, and EtherType part;

A third-class header compression object including the first-class header compression object and a part of the static class (at least including one of: static, static-def, and static-known) and unique to each Ethernet frame format;

A fourth-class header compression object including the second-class header compression object and the part of the static class (at least including one of: static, static-def, and static-known) and unique to each Ethernet frame format;

A fifth-class header compression object including parts of all different classes in the Ethernet frame, that is, parts of all different classes in the Ethernet frame are taken as the header compression object, where different classes generally correspond to different compression manners;

A sixth-class header compression object including a part of the first class and common to different Ethernet frame formats, where the first class at least includes one of: inferred, static, static-def, and static-known;

A seventh-class header compression object including the sixth-class header compression object and a part of the first class and unique to each Ethernet frame format; and An eighth-class header compression object including the second-class header compression object and the part of the first class and unique to each Ethernet frame format.

In some implementations, when the Ethernet frame includes a VLAN subheader, the header compression object of each class at least further includes one of: a part of the static class (at least including one of: static, static-def, and static-known) in the VLAN subheader, a part of the first class (at least including one of: inferred, static, static-def, and static-known) in the VLAN subheader, and parts of all different classes in the VLAN subheader.

Different classes of header compression objects have their respective advantages. For example, for the first-class header compression object, there is no need to distinguish between different frame formats, which is the simplest manner of header compression. For the second-class header compression object, based on the first-class header compression object, a part that does not belong to the static class and common to different Ethernet frame formats is also processed, which improves compression efficiency. For the third-class header compression object and the fourth-class header compression object, based on the first-class header compression object and the second-class header compression object, the part of the static class and unique to each Ethernet frame format is also processed, which further improves compression efficiency. For the fifth-class header compression object, compression efficiency is the highest, but it is necessary for a compressor and a decompressor to distinguish between different Ethernet frame formats, and on the other hand, compression of a part classified as changing needs to be taken into consideration, which is complex in compression. In addition, when the Ethernet frame includes a VLAN subheader, it is possible to solve the problem of header compression on the Ethernet frame which includes the VLAN subheader.

In some implementations, the following can be conducted. A padding part in the Ethernet frame subjected to compression is not transmitted, thereby improving transmission efficiency. Subsequently, the padding part will be automatically filled in during decompression.

Figure 4:
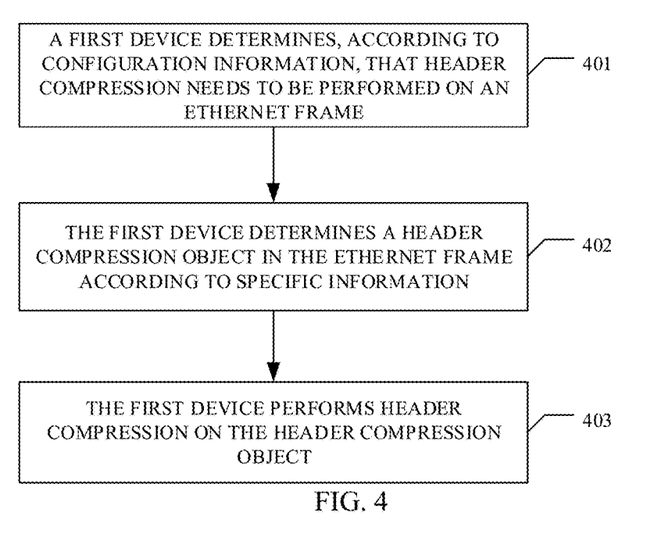
FIG. 4 is a schematic flowchart of a method for header compression of an Ethernet frame according to implementations.

Based on the description above, FIG. 4 is a schematic flowchart of a method for header compression of an Ethernet frame according to implementations. As illustrated in FIG. 4, the method includes the following.

At block 401, a first device determines, according to configuration information, that header compression needs to be performed on the Ethernet frame.

At block 402, the first device determines a header compression object in the Ethernet frame according to specific information.

At block 403, the first device performs header compression on the header compression object.

As can be seen, with the technical solution of implementations, it is possible to achieve header compression of the Ethernet frame, thereby saving air interface resources and improving data transmission efficiency.

In practice, the first device may be a terminal device, or may be a network device. The network device may be a base station, a core network device, etc. If the first device is the terminal device, the terminal device will serve as a compressor, and the network device will serve as a decompressor. If the first device is the network device, the network device will serve as the compressor, and the terminal device will serve as the decompressor. The technical solutions of implementations will be hereinafter elaborated under a scenario in which the first device is the terminal device.

The configuration information may include first dedicated information. The network device can configure, with aid of the first dedicated information, whether the terminal device performs header compression on an Ethernet frame information header. In some implementations, the first dedicated information is profile information. The configuration information may further include a second dedicated information. The network device can configure, with aid of the second dedicated information, each type of context information of the terminal device during header compression. As an example, the second dedicated information is the maximum context number, MAX CID. The terminal device can determine, according to dedicated information used by the Ethernet frame information header (such as the profile information), whether header compression needs to be performed on the Ethernet frame. If yes, the terminal device further needs to determine the header compression object according to the specific information, thereby performing header compression on the header compression object.

In some implementations, the header compression object can be determined according to the specific information as follows. The header compression object is determined according to pre-defined information, or the header compression object is determined according to indication information, or the header compression object is determined according to the first dedicated information (such as the profile information).

The following will describe in detail the technical solution of implementations under a scenario in which the first dedicated information is the profile information used by the Ethernet frame information header.

1) Example 1

The terminal device can determine, according to the profile information configured by the network device, whether header compression needs to be performed on the Ethernet frame. For example, the network device can configure, with a radio resource control (RRC) message, a profile used by the Ethernet frame information header, that is, introduce a new profile. As an example, a new IE is added to PDCP-config:

```
PDCP-Config ::=        SEQUENCE {
...
headerCompression      CHOICE {
            notUsed                    NULL,
            rohc                       SEQUENCE {
            maxCID                     INTEGER (1..16383)
    Default 15,
            profiles                   SEQUENCE {
                    profile0x0001      BOOLEAN,
                    profile0x0002      BOOLEAN,
                    profile0x0003      BOOLEAN,
                    profile0x0004      BOOLEAN,
                    profile0x0006      BOOLEAN,
                    profile0x0101      BOOLEAN,
                    profile0x0102      BOOLEAN,
                    profile0x0103      BOOLEAN,
                    profile0x0104      BOOLEAN,
                    profile0x0105      BOOLEAN
            },
            drb-ContinueROHC           ENUMERATED
                                       { true }
OPTIONAL    -- Need R
            },
            uplinkOnlyROHC             SEQUENCE {
            maxCID                     INTEGER (1..16383)
    DEFAULT 15,
            profiles                   SEQUENCE {
                    profile0x0006      BOOLEAN
            },
            drb-ContinueROHC           ENUMERATED
                                       { true }
OPTIONAL    -- Need R
            },
            ...
    },
...
};
```

Profile0x0105 is a newly added IE.

The terminal device can determine, according to a value of the profile acquired, whether header compression needs to be performed on the Ethernet frame. For example, if profile0x0105 is true, the terminal device determines that header compression needs to be performed on the Ethernet frame.

Subsequently, the terminal device can determine the header compression object according to the pre-defined information.

The pre-defined information can be pre-specified in a protocol, or can be indicated by the network device when the terminal device is initially accessed, or can be broadcasted.

For example, it can be specified in the protocol that header compression needs to be performed on a part of the static class in the Ethernet frame, that is, the part of the static class in the Ethernet frame is taken as the header compression object.

For another example, it can be specified in the protocol that header compression needs to be performed on the part of the static class and common to different Ethernet frame formats.

For another example, it can be specified in the protocol that header compression needs to be performed on the part common to different Ethernet frame formats.

For another example, it can be specified in the protocol which Ethernet frame format or which subfield in each Ethernet frame format needs header compression. As an example, the subfield that needs header compression can be determined according to a type of the subfield.

After the header compression object is determined, the terminal device can perform a corresponding header compression, such as header compression in a uni-directional mode (U mode), a bi-directional reliable mode (R mode), or a bi-directional optimistic mode (O mode). Accordingly, the terminal device migrates between three header compression states according to a transmission state. The terminal device can also deliver downward a compressed data packet thus obtained, for PDCP layer processing and/or radio link control (RLC) layer processing and the like.

The network device, as the decompressor, decompresses the compressed data packet and delivers upward the decompressed data packet. The network device, upon receiving the compressed data packet from the terminal device, can map the compressed data packet onto queues with different context IDs (CID) according to the profile and a CID (carried in the compressed data packet), and decompresses the compressed data packet in the U mode, or the R mode, or the O mode. Accordingly, the network device migrates between three decompression states according to a transmission state. Subsequently, the network device can send to the terminal device a header compression feedback packet.

The three header compression states of the compressor are in one-to-one correspondence with the three decompression states of the decompressor. The compressor and the decompressor each have three states, namely an initialization state, an intermediate state, and a full state, which represent different efficiencies in header compression (from low to high). The three states of the compressor are respectively referred to as an initialization and refresh (IR) state, a first order (FO) state, and a second order (SO) state. The three states of the decompressor are respectively referred to as a no context (NC) state, a static context (SC) state, and a full context (FC) state. The compressor migrates between the above states according to a certain rule to complete header compression, and similarly, the decompressor migrates between the above states according to a certain rule to complete header decompression.

During header compression, the following packet formats can be adopted: an IR packet (an initialization packet which includes a static chain subheader, and may further include a changing chain subheader), an IR-DYN packet (including a changing chain subheader), packet type 0, packet type 1, and packet type 2. In the NC state or the IR state (the initialization state), only the IR packet is transmitted between the compressor and the decompressor. When there is a need to completely change or partially change information in a changing chain subheader (the intermediate state), the IR-DYN packet or the packet type 2 is transmitted between the compressor and the decompressor. In the SO state or in the case where there is no error in context information (the FC state), all types of packets are transmitted between the compressor and the decompressor.

During header compression, when it is necessary to process subheaders other than subheaders of the static class, an Ethernet frame header subjected to compression may have the following format (taking Ethernet/RTP/UDP/IP as an example):

```
 0  1  2  3  4  5  6  7
--- --- --- --- --- --- --- ---
:     Add-CID octet : if for small CIDs and CID 1-15
+---+---+---+---+---+---+---+---+
| first octet of base header | (with type indication)
+---+---+---+---+---+---+---+---+
:                           :
/ 0, 1, or 2 octets of CID    / 1-2 octets if large CIDs
:                           :
+---+---+---+---+---+---+---+---+
/ remainder of base header  / variable number of bits
+---+---+---+---+---+---+---+---+
:                           :
/  Extension          / extension, if X = 1 in base header
:                           :
--- --- --- --- --- --- --- ---
+  IP-ID of outer IPv4 header + 2 octets, if value(RND2) = 1
:                           :
/   AH data for outer list / variable
--- --- --- --- --- --- --- ---
+   GRE checksum    + 2 octets, if GRE flag C = 1
:                           :
--- --- --- --- --- --- --- ---
+   IP-ID of inner IPv4 header + 2 octets, if value(RND) = 1
--- --- --- --- --- --- --- ---
/   AH data for inner list / variable (see 5.8.4.2)
--- --- --- --- --- --- --- ---
+   GRE checksum + 2 octets, if GRE flag C = 1
:                           :
---+---+---+---+---+---+---+---
: 1| 1| 1| 1|PRI   |CFI/DEI : (if VLAN is included).
--- --- --- --- --- --- --- ---
```

Alternatively, the Ethernet frame header subjected to compression may have the following format (taking Ethernet/RTP/UDP/IP as an example):

```
 0  1  2  3  4  5  6  7
--- --- --- --- --- --- --- ---
:     Add-CID octet : if for small CIDs and CID 1-15
+---+---+---+---+---+---+---+---+
| first octet of base header | (with type indication)
+---+---+---+---+---+---+---+---+
:                           :
/ 0, 1, or 2 octets of CID    / 1-2 octets if large CIDs
:                           :
+---+---+---+---+---+---+---+---+
/remainder of base header/ variable number of bits
+---+---+---+---+---+---+---+---+
:                           :
/  Extension          / extension, if X = 1 in base header
:                           :
--- --- --- --- --- --- --- ---
+  IP-ID of outer IPv4 header + 2 octets, if value(RND2) = 1
:                           :
/   AH data for outer list / variable
--- --- --- --- --- --- --- ---
+   GRE checksum    + 2 octets, if GRE flag C = 1
:                           :
--- --- --- --- --- --- --- ---
+   IP-ID of inner IPv4 header + 2 octets, if value(RND) = 1
:                           :
--- --- --- --- --- --- --- ---
/   AH data for inner list / variable (see 5.8.4.2)
--- --- --- --- --- --- --- ---
:                           :
+   GRE checksum + 2 octets, if GRE flag C = 1
:             : +---+---+---+---+---+---+---+
--- --- --- --- --- --- --- ---
: 1| 1| 1| 1|PRI|   |CFI/DEI : (if VLAN is included).
+---+---+---+---+---+---+---+---+
+ Ether type(type/length) + 2 octets, if GRE flag C = 1
:                           :
--- --- --- --- --- --- --- ---;
```

Alternatively, the Ethernet frame header subjected to compression may have the following format (with no IP packet):

```
0 1 2 3 4 5 6 7
--- --- --- --- --- --- --- --- ---
:    Add-CID octet : if for small CIDs and CID 1-15
+---+---+---+---+---+---+---+---+
|first octet of base header| (with type indication)
+---+---+---+---+---+---+---+---+
:                        :
/ 0, 1, or 2 octets of CID    / 1-2 octets if large CIDs
:                        :
+---+---+---+---+---+---+---+---+
/remainder of base header/ variable number of bits
+---+---+---+---+---+---+---+---+
: 1| 1| 1| 1|PRI|   |CFI/DEI : if VLAN is included.
--- --- --- --- --- --- --- ---;
:                        :
 + Ether type(type/length) + 2 octets, if GRE flag C = 1
:                        :
--- --- --- --- --- --- --- ---;
   An extension scheme of a VLAN field may also
   be as follows:
   Extension scheme 1:
--- --- --- --- --- --- --- ---
: 0| 0| 0| 0|PRI|   |CFI/DEI: if VLAN is included.
--- --- --- --- --- --- --- ---
   Extension scheme 2:
-- --- --- --- --- --- --- ---
: PRI|   |CFI/DEI |0| 0| 0| 0: if VLAN is included.
--- --- --- --- --- --- --- ---
   Extension scheme 3:
--- --- --- --- --- --- --- ---
: PRI       |0 |0| 0| 0| 0: if VLAN is included.
--- --- --- --- --- --- --- ---
   Extension scheme 4:
--- --- --- --- --- --- --- ---
: 0 |0| 0| 0| 0 | PRI    : if VLAN is included.
--- --- --- --- --- --- --- ---.
```

If header compression and decompression are performed only on the part of the static class in the Ethernet frame, the compressor and the decompressor will migrate between two states only, i.e the initialization state and the full state.

The compressor migrates between the IR state and the SO state. The decompressor migrates between the NC state and the FC state.

Figure 5:
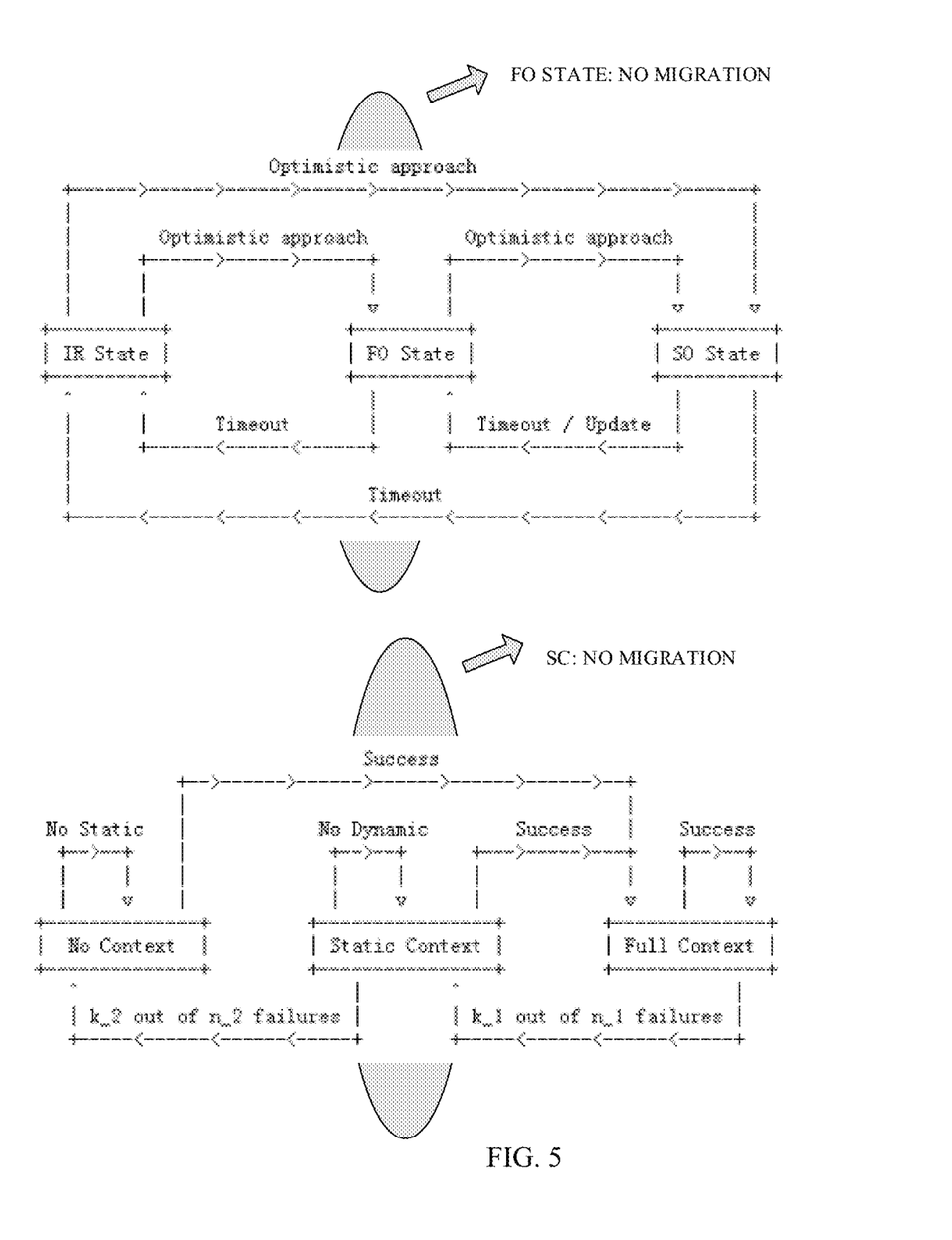
FIG. 5 is a schematic diagram illustrating state migration according to implementations.

As an example, in the U-mode, the decompressor can be defined to migrate from the FC state to the NC state after K3 out of N3 failures. FIG. 5 is a schematic diagram illustrating state migration according to implementations.

In addition, the IR packet can be used for initialization of header compression on the Ethernet frame, and a profile corresponding to the Ethernet frame is used. A static chain ends with a static part of the Ethernet frame.

When the Ethernet frame is carried in the PDU session, the QoS flow, or the DRB, the profile information may be configured or indicated based on the PDU session, the QoS flow, or the DRB. The header compression object based on the PDU session or the QoS flow carried on each carrier may be the same or may be different, which can improve flexibility in header compression, and as such, header compression can be performed in different manners according to different data flows.

2) Example 2

The terminal device can determine, according to the profile information configured by the network device, whether header compression needs to be performed on the Ethernet frame. In addition, the terminal device can also determine the header compression object according to the indication information of the network device, for example, determine the header compression object according to dedicated signaling indication information. The dedicated signaling may be RRC signaling, media access control element (MAC CE), or downlink control information (DCI), etc. The dedicated signaling may be issued along with other header compression configuration, or may be new configuration information/indication information.

When the Ethernet frame is carried in the PDU session, the QoS flow, or the DRB, the dedicated signaling may be configured or indicated based on the PDU session, the QoS flow, or the DRB. The header compression object based on the PDU session or the QoS flow carried on each carrier may be the same or may be different, which can improve flexibility in header compression, and as such, header compression can be performed in different manners according to different data flows.

For example, a new profile can be introduced. As an example, a new IE is added to PDCP-config:

```
PDCP-Config ::=      SEQUENCE {
...
headerCompression       CHOICE {
              notUsed                NULL,
              rohc                   SEQUENCE {
              maxCID                 INTEGER (1..16383)
  Default 15,
                 profiles                SEQUENCE {
                    profile0x0001           BOOLEAN,
                    profile0x0002           BOOLEAN,
                    profile0x0003           BOOLEAN,
                    profile0x0004           BOOLEAN,
                    profile0x0006           BOOLEAN,
                    profile0x0101           BOOLEAN,
                    profile0x0102           BOOLEAN,
                    profile0x0103           BOOLEAN,
                    profile0x0104           BOOLEAN,
                    profile0x0105           BOOLEAN
                 },
                 ObjectEthernet   ENUMERATED { static, all }
  OPTIONAL    -- Need R
                 drb-ContinueROHC        ENUMER-
                                         ATED { true
                                         }
  OPTIONAL    -- Need R
              },
              uplinkOnlyROHC          SEQUENCE {
              maxCID                  INTEGER
                                      (1..16383)
  DEFAULT 15,
                 profiles                SEQUENCE {
                    profile0x0006           BOOLEAN
                 },
                 drb-ContinueROHC        ENUMER-
                                         ATED { true
                                         }
  OPTIONAL    -- Need R
              },
              ...
     },
...
};
```

Profile0x0105 and ObjectEthernet are newly added IEs.

The terminal device can determine, according to a value of the profile acquired, whether header compression needs to be performed on the Ethernet frame. For example, if profile0x0105 is true, the terminal device determines that header compression needs to be performed on the Ethernet frame.

Then, the terminal device can determine the header compression object according to a value of ObjectEthernet. For example, a value of "static" indicates that the header compression object is the part of the static class in the Ethernet frame, and a value of "all" indicates that the header compression object is parts of all different classes in the Ethernet frame. ObjectEthernet may also have other values indicative of different header compression objects. In addition, the value of ObjectEthernet is not limited to such a format like "static" and "all", and instead, may be in other formats, such as option1, option2, option3, and the like, where different options represent different header compression objects. For example, option1 represents the first-class header compression object, that is, the part of the static class and common to different Ethernet frame formats.

After the terminal device determines the header compression object, for details of header compression performed by the terminal device and decompression performed by the network device, reference can be made to the related description in example 1, which will not be repeated herein.

In addition, for details of the format of the Ethernet frame header subjected to compression, and various compression states, decompression states, and initialization states of the compressor and the decompressor, reference can be made to the related description in example 1, which will not be repeated herein.

By means of technical solution in example 2, it is possible to modify compression granularity and compression efficiency according to an indication of the network device, which makes header compression more flexible.

3) Example 3

The network device can configure, through the RRC message, multiple pieces of profile information used by the Ethernet frame information header, where different profile information can represent a distinct header compression object. On the other hand, the terminal device can determine, according to the profile information, whether header compression needs to be performed on the Ethernet frame.

When the Ethernet frame is carried in the PDU session, the QoS flow, or the DRB, the profile information may be configured or indicated based on the PDU session, the QoS flow, or the DRB. The header compression object based on the PDU session or the QoS flow carried on each carrier may be the same or may be different, which can improve flexibility in header compression, and as such, header compression can be performed in different manners according to different data flows.

For example, a new profile can be introduced. As an example, a new IE is added to PDCP-config:

```
PDCP-Config ::=        SEQUENCE {
...
headerCompression      CHOICE {
       notUsed                  NULL,
       rohc                     SEQUENCE {
       maxCID                   INTEGER (1..16383)
    Default 15,
       profiles                 SEQUENCE {
           profile0x0001            BOOLEAN,
           profile0x0002            BOOLEAN,
           profile0x0003            BOOLEAN,
           profile0x0004            BOOLEAN,
           profile0x0006            BOOLEAN,
           profile0x0101            BOOLEAN,
           profile0x0102            BOOLEAN,
           profile0x0103            BOOLEAN,
           profile0x0104            BOOLEAN,
           profile0x0105            BOOLEAN
       },
       drb-ContinueROHC         ENUMERATED
                                { true }
    OPTIONAL     -- Need R
       },
       uplinkOnlyROHC           SEQUENCE {
       maxCID                   INTEGER (1..16383)
```

-continued

```
    Default 15,
       profiles                 SEQUENCE {
           profile0x0006            BOOLEAN
       },
       drb-ContinueROHC         ENUMERATED
                                { true }
    OPTIONAL     -- Need R
       },
       ...
    };
```

Profile0x0105, profile0x0106, profile0x0107, profile0x0108, profile0x0115, profile0x0116, profile0x0117, and profile0x0118 are newly added IEs, and the header compression object represented by each of the above profiles is shown in the following table.

TABLE 6

Header compression objects represented by different profiles

| Profile Identifier | Usage | Reference |
|---|---|---|
| 0x0105 | Ethernet static class | RFC 3095, RFC 4815 |
| 0x0106 | Ethernet/VLAN static class | RFC 3095, RFC 4815 |
| 0x0107 | Ethernet | RFC 3095, RFC 4815 |
| 0x0108 | Ethernet/VLAN | RFC 3095, RFC 4815 |
| 0x0115 | Ethernet static class | RFC 5225 |
| 0x0116 | Ethernet/VLAN static class | RFC 5225 |
| 0x0117 | Ethernet | RFC 5225 |
| 0x0118 | Ethernet/VLAN | RFC 5225 |

As shown in the above table, if the profile acquired by the terminal device is profile0x0105, and profile0x0105 is true, the terminal device can determine that header compression needs to be performed on the Ethernet frame, determine that the header compression object is "Ethernet static class" (that is, the part of the static class in the Ethernet frame is taken as the header compression object), and determine that a remote function call (RFC) protocol for reference is RFC3095. The header compression object represented by "Ethernet/VLAN static class" includes the part of the static class in the Ethernet frame and a part of the static class in the VLAN subheader. The header compression object represented by "Ethernet" includes parts of all different classes in the Ethernet frame.

It should be noted that, the header compression object shown in the above table is merely for illustrative purposes and is however not intended to limit the technical solution of implementations. In practice, the profile can be defined in other granularities according to actual needs, thereby indicating different header compression objects or header compression granularities.

After the terminal device determines the header compression object, for details of header compression performed by the terminal device and decompression performed by the network device, reference can be made to the related description in example 1, which will not be repeated herein.

In addition, for details of the format of the Ethernet frame header subjected to compression, and various compression states, decompression states, and initialization of the compressor and the decompressor, reference can be made to the related description in example 1, which will not be repeated herein.

By means of technical solution in example 3, different profiles can be indicative of different compression granularities and compression efficiencies, which improves flexibility in header compression.

In the description above, the terminal device serves as the compressor, and the network device serves as the decompressor. If the network device serves as the compressor and the terminal device serves as the decompressor, header compression can be performed in a similar manner. The network device can determine, according to its configuration or configuration from a core network, whether header compression needs to be performed on the Ethernet frame and determine the header compression object, thus performing header compression on the header compression object determined. The network device can also transmit a compressed data packet thus obtained to the terminal device for decompression. For details thereof, reference can be made to the foregoing description, which will not be repeated herein By adopting the technical solution of implementations, header compression on the Ethernet frame can be achieved, which is possible to save air interface resources and improve data transmission efficiency.

The method implementations have been elaborated above. In the following, the technical solution of implementations will be further described in apparatus implementations.

Figure 6:
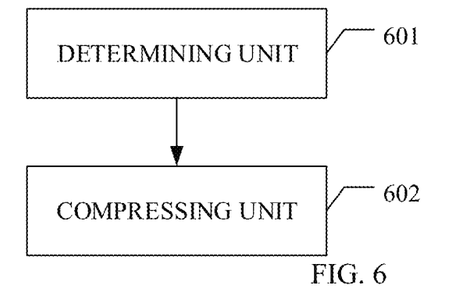
FIG. 6 is a schematic structural diagram of an apparatus for header compression of an Ethernet frame according to implementations.

FIG. 6 is a schematic structural diagram of an apparatus for header compression of an Ethernet frame according to implementations. As illustrated in FIG. 6, the apparatus includes a determining unit 601 and a compressing unit 602.

The determining unit 601 is configured to operate as follows. The determining unit 601 is configured to determine, according to configuration information, that header compression needs to be performed on the Ethernet frame. The determining unit 601 is configured to determine a header compression object in the Ethernet frame according to specific information. The compressing unit 602 is configured to perform header compression on the header compression object.

In some implementations, the determining unit 601 is configured to determine, according to first dedicated information, that header compression needs to be performed on the Ethernet frame. The determining unit 601 can also determine the header compression object according to the specific information, and as such, the compressing unit 602 can perform header compression on the header compression object.

In some implementations, in terms of determining the header compression object according to the specific information, the determining unit 601 is configured to determine the header compression object according to pre-defined information, or determine the header compression object according to indication information, or determine the header compression object according to the first dedicated information.

In some implementations, the first dedicated information includes profile information used by an Ethernet frame information header.

In some implementations, in terms of determining the header compression object according to the indication information, the determining unit 601 is configured to determine the header compression object according to dedicated signaling indication information. In some implementations, in terms of determining the header compression object according to the first dedicated information, the determining unit 601 is configured to determine the header compression object corresponding to the profile information, where each profile information represents a distinct header compression object.

In some implementations, the header compression object determined at least includes one of the following first~eighth class header compression objects.

A first-class header compression object including a part of a static class and common to different Ethernet frame formats;

A second-class header compression object including a part common to different Ethernet frame formats;

A third-class header compression object including the first-class header compression object and a part of the static class and unique to each Ethernet frame;

A fourth-class header compression object including the second-class header compression object and the part of the static class and unique to each Ethernet frame format;

A fifth-class header compression object including parts of all different classes in the Ethernet frame;

A sixth-class header compression object including a part of a first class and common to different Ethernet frame formats;

A seventh-class header compression object including the sixth-class header compression object and a part of the first class and unique to each Ethernet frame format; and An eighth-class header compression object including the second-class header compression object and the part of the first class and unique to each Ethernet frame format.

In some implementations, when the Ethernet frame includes a VLAN subheader, the header compression object of each class at least further includes one of: a part of the static class in the VLAN subheader, a part of the first class in the VLAN subheader, and parts of all different classes in the VLAN subheader.

In some implementations, the compressing unit 602 is configured to perform at least one of the following. The compressing unit 602 is configured to skip transmitting a padding part in the Ethernet frame subjected to compression, thereby improving transmission efficiency. Subsequently, the padding part will be automatically filled in during decompression. The compressing unit 602 is configured to skip header compression on a preamble, an SFD, and/or an FCS, because the preamble, the SFD, and the FCS in the Ethernet frame are not transmitted in a 5G system.

Ethernet frames of different formats have common parts. At the same time, each Ethernet frame format has its unique part. According to transmission characteristics of subheaders in different Ethernet frame formats, different subheaders can be classified into different classes.

In some implementations, the different classes at least include one of: static, static-def, static-known, changing, and inferred, where static, static-def, and static-known are collectively referred to as the static class, and inferred, static, static-def, and static-known are collectively referred to as the first class.

Among the above header compression objects, a part of the static class usually at least includes one of: a part classified as static, a part classified as static-def, and a part classified as static-known. Similarly, a part of the first class usually at least includes one of: a part classified as inferred, a part classified as static, a part classified as static-def, and a part classified as static-known.

For details of the working process of the apparatus implementations illustrated in FIG. 6, reference can be made to the related description in the foregoing method implementations, which will not be repeated herein.

In addition, the apparatus illustrated in FIG. 6 is applicable to a terminal device or a network device. When applied to the terminal device, the apparatus can acquire the profile information configured by the network device and/or the indication information of the network device.

Figure 7:
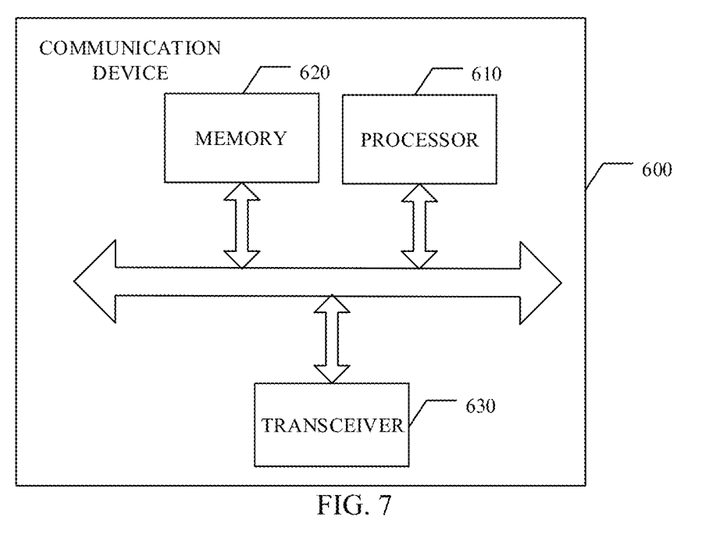
FIG. 7 is a schematic structural diagram of a communication device 600 according to implementations.

FIG. 7 is a schematic structural diagram of a communication device 600 according to implementations. As illustrated in FIG. 7, the communication device 600 includes a processor 610. The processor 610 can invoke and execute computer programs stored in a memory 620 to perform the method provided in implementations.

As illustrated in FIG. 7, the communication device 600 can further include the memory 620. The processor 610 can invoke and execute the computer programs stored in the memory 620 to perform the method provided in implementations.

The memory 620 may be a separate device independent of the processor 610, or may be integrated into the processor 610.

As illustrated in FIG. 7, the communication device 600 can further include a transceiver 630. The processor 610 can control the transceiver 630 to communicate with other devices, for example, to send information or data to other devices, or to receive information or data from other devices.

The transceiver 630 may include a transmitter and a receiver. The transceiver 630 may further include an antenna, where one or more antenna can be provided.

The communication device 600 may be the network device of implementations, and the communication device 600 can implement the operations performed by the network device described in the foregoing method implementations, which will not be repeated herein for the sake of simplicity.

Alternatively, the communication device 600 may be the mobile terminal/the terminal device of implementations, and the communication device 600 can implement the operations performed by the mobile terminal/the terminal device described in the foregoing method implementations, which will not be repeated herein for the sake of simplicity.

Figure 8:
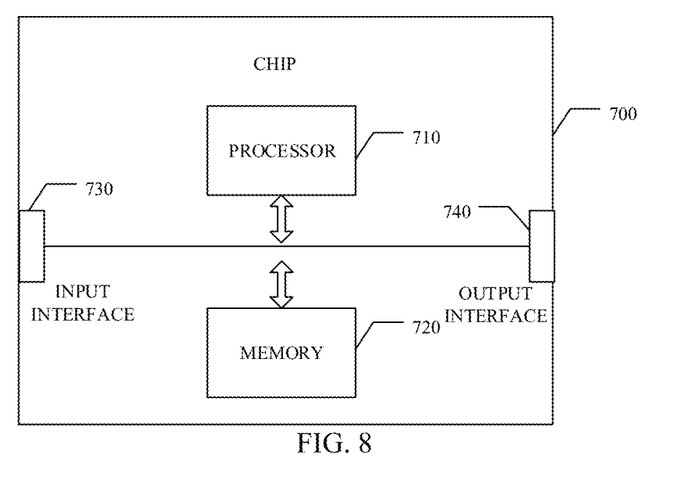
FIG. 8 is a schematic structural diagram of a chip 700 according to implementations.

FIG. 8 is a schematic structural diagram of a chip 700 according to implementations. As illustrated in FIG. 8, the chip 700 includes a processor 710. The processor 710 is configured to invoke and execute computer programs stored in a memory to perform the method provided in implementations.

As illustrated in FIG. 8, the chip 700 further includes the memory 720. The processor 710 can invoke and execute the computer programs stored in the memory 720 to perform the method provided in implementations.

The memory 720 may be a separate device independent of the processor 710, or may be integrated into the processor 710.

The chip 700 may further include an input interface 730. The processor 710 can control the input interface 730 to communicate with other devices or chips, for example, to acquire information or data sent by other devices or chips.

The chip 700 may further include an output interface 740. The processor 710 can control the output interface 740 to communicate with other devices or chips, for example, to output information or data to other devices or chips.

The chip is applicable to the network device of implementations. The chip can implement the operations performed by the network device described in the foregoing method implementations, which will not be repeated herein for the sake of simplicity.

Alternatively, the chip is applicable to the mobile terminal/the terminal device. The chip can implement the operations performed by the mobile terminal/the terminal device described in the foregoing method implementations, which will not be repeated herein for the sake of simplicity.

It should be understood that, the chip herein may also be referred to as a system-on-chip (SOC).

Figure 9:
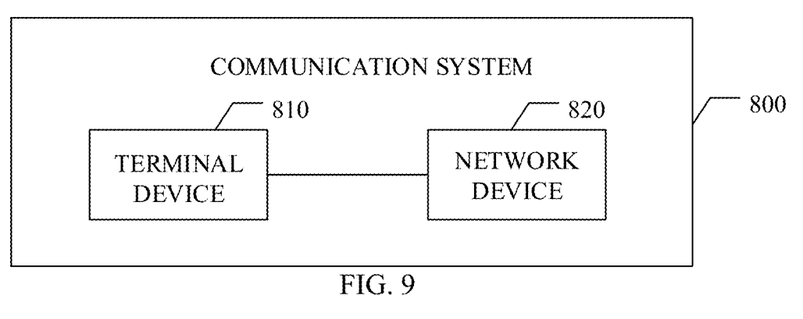
FIG. 9 is a schematic block diagram of a communication system 800 according to implementations.

FIG. 9 is a schematic block diagram of a communication system 800 according to implementations. As illustrated in FIG. 9, the communication system 800 includes a terminal device 810 and a network device 820.

The terminal device 810 can implement functions of the terminal device described in the foregoing method implementations, and the network device 820 can implement functions of the network device described in the foregoing method implementations, which will not be repeated herein for the sake of simplicity.

The processor referred to herein may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDR SDRAM), an enhanced synchronous dynamic random access memory (ESDRAM), a synchronous link dynamic random access memory (synch-link DRAM, SLDRAM), and a direct rambus random access memory (direct rambus RAM, DRRAM). The memory of the systems and methods described herein is intended to include, but is not limited to, these and any other suitable types of memory.

Implementations further provide a computer readable storage medium. The computer readable storage medium is configured to store computer programs.

The computer readable storage medium is applicable to the network device of implementations. The computer programs, when executed, are operable with a computer to implement the operations performed by the network device described in the foregoing method implementations, which will not be repeated herein for the sake of simplicity.

Alternatively, the computer readable storage medium is applicable to the mobile terminal/the terminal device. The computer programs, when executed, are operable with a computer to implement the operations performed by the mobile terminal/the terminal device described in the foregoing method implementations, which will not be repeated herein for the sake of simplicity.

Implementations further provide a computer program product. The computer program product includes computer program instructions.

The computer program product is applicable to the network device of implementations. The computer program instructions, when executed, are operable with a computer to implement the operations performed by the network device described in the foregoing method implementations, which will not be repeated herein for the sake of simplicity.

Alternatively, the computer program product is applicable to the mobile terminal/the terminal device. The computer program instructions, when executed, are operable with a computer to implement the operations performed by the mobile terminal/the terminal device described in the foregoing method implementations, which will not be repeated herein for the sake of simplicity.

Implementations further provide a computer program.

The computer program is applicable to the network device of implementations. The computer program, when executed by a computer, is operable with the computer to implement the operations performed by the network device described in the foregoing method implementations, which will not be repeated herein for the sake of simplicity.

Alternatively, the computer program is applicable to the mobile terminal/the terminal device. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for header compression of an Ethernet frame, comprising:
    determining, by a first device, according to configuration information, that header compression needs to be performed on the Ethernet frame;
    determining, by the first device, a header compression object in the Ethernet frame according to specific information; and
    performing, by the first device, header compression on the header compression object;
    wherein the header compression object comprises tag protocol identifier (TP-ID) and/or canonical format indicator/drop eligible indicator (CFI/DEI) in a virtual local area network (VLAN) subheader of the Ethernet frame.

2. The method of claim 1, wherein determining the header compression object according to the specific information comprises one of:
    determining the header compression object according to pre-defined information; and
    determining the header compression object according to indication information.

3. The method of claim 1, wherein the header compression object at least comprises:
    a second-class header compression object comprising a part common to different Ethernet frame formats.

4. The method of claim 1, further comprising:
skipping header compression on at least one of a preamble, a start of frame delimiter (SFD), and a frame check sequence (FCS).

5. A terminal device, comprising:
a memory configured to store computer programs; and
a processor configured to invoke and execute the computer programs stored in the memory to:
determine, according to configuration information, that header compression needs to be performed on an Ethernet frame;
determine a header compression object in the Ethernet frame according to specific information; and
perform header compression on the header compression object;
wherein the header compression object comprises tag protocol identifier (TP-ID) and/or canonical format indicator/drop eligible indicator (CFI/DEI) in a virtual local area network (VLAN) subheader of the Ethernet frame.

6. The terminal device of claim 5, wherein the processor configured to determine the header compression object according to the specific information is configured to:
determine the header compression object according to pre-defined information or indication information.

7. The terminal device of claim 5, wherein the header compression object at least comprises:
a second-class header compression object comprising a part common to different Ethernet frame formats.

8. The terminal device of claim 5, wherein the processor is further configured to:
skip header compression on at least one of a preamble, a start of frame delimiter (SFD), and a frame check sequence (FCS).

9. A non-transitory computer readable storage medium configured to store computer programs which are operable with a computer to:
determine, according to configuration information, that header compression needs to be performed on an Ethernet frame;
determine a header compression object in the Ethernet frame according to specific information; and
perform header compression on the header compression object;
wherein the header compression object comprises tag protocol identifier (TP-ID) and/or canonical format indicator/drop eligible indicator (CFI/DEI) in a virtual local area network (VLAN) subheader of the Ethernet frame.

10. The non-transitory computer readable storage medium of claim 9, wherein the computer programs operable with the computer to determine the header compression object according to the specific information are operable with the computer to:
determine the header compression object according to pre-defined information or indication information.

11. The non-transitory computer readable storage medium of claim 9, wherein the header compression object at least comprises:
a second-class header compression object comprising a part common to different Ethernet frame formats.

12. The non-transitory computer readable storage medium of claim 9, wherein the computer programs are further operable with the computer to:
skip header compression on at least one of a preamble, a start of frame delimiter (SFD), and a frame check sequence (FCS).

* * * * *